Oct. 17, 1939.                F. KEIDEL                2,176,459
                                SEAL
                         Filed Oct. 18, 1938
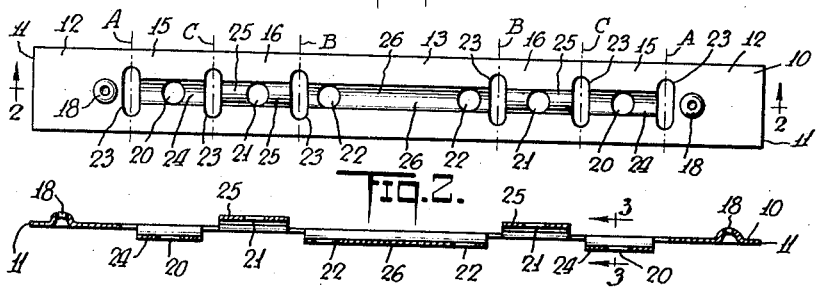
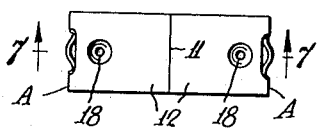
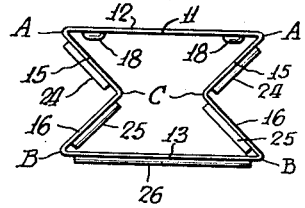
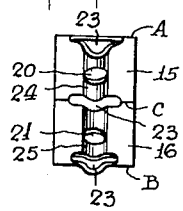
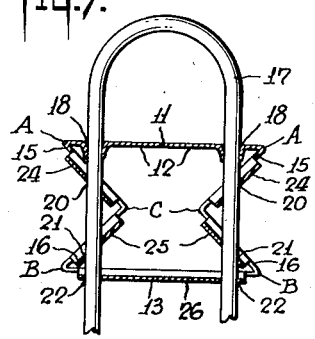
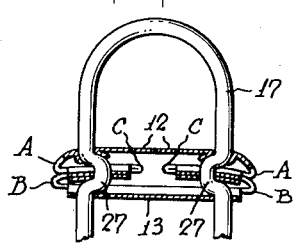
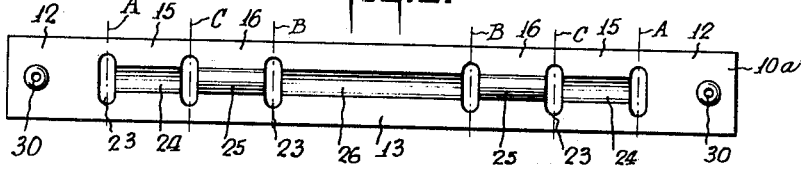
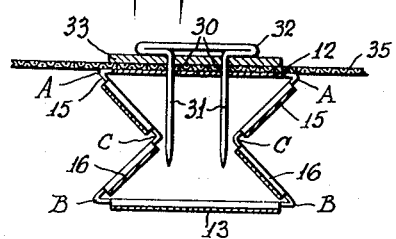
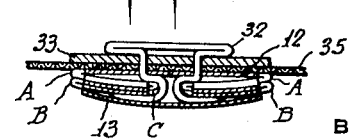
INVENTOR
Frank Keidel
BY
ATTORNEYS Patented Oct. 17, 1939

2,176,459

UNITED STATES PATENT OFFICE 2,176,459

SEAL

Frank Keidel, Elmhurst, N. Y., assignor to The International Seal and Knot Protector Co., New York, N. Y., a corporation of New York Application October 18, 1938, Serial No. 235,588

8 Claims. (Cl. 292—315)

The present invention relates to seals of the type, which are used for sealing, identifying, tagging or the like, and which when attached to some member cannot be removed without leaving telltale evidence, as for instance by being broken or mutilated.

Among the objects of the present invention is to provide a new and improved seal of the type referred to, which is reliable in use, simple in construction, inexpensive to manufacture, and easy to apply.

As a feature of the present invention, the seal is bendable into closed sealing position, but is too weak along its fold lines to withstand reverse bending towards open position.

As another feature, the seal is adapted to cooperate with a staple or other attaching member formed of a section of bendable wire, so that when the seal is collapsed into closed sealing position, it will deform the portion of said attaching member confined therein, to prevent withdrawal of said attaching member without detectable mutilation or destruction of the seal.

As another feature, the seal comprises a single strip of comparatively rigid but bendable material, such as thin sheet metal, having a series of predetermined fold lines along which the various sections of said strip may be crimped and collapsed into overlapping sealing position.

As another feature, the seal strip above referred to is embossed at spaced sections with reinforcing channel ribs, so arranged, that in overlapping sealing position of these sections, their superposed ribs will be nested to permit said sections to be more sharply bent along their fold lines.

Various other objects and features of the present invention will be apparent from the following particular description, and from an inspection of the accompanying drawing, in which:

Fig. 1 is a plan view of a strip blank for a form of shackle receiving seal embodying the present invention, Fig. 2 is a longitudinal section of the blank taken on line 2—2 of Fig. 1, Fig. 3 is a transverse section of the blank taken on line 3—3 of Fig. 2, Fig. 4 is a top plan view of the open seal made from the blank of Figs. 1 to 3, and shown prior to receiving the shackle, Fig. 5 is an end view of the seal shown in Fig. 4, Fig. 6 is a side view of the seal shown in Fig. 4, Fig. 7 is a section taken on line 7—7 of Fig. 4, but showing the shackle inserted in the open seal, Fig. 8 is a section similar to Fig. 7, but showing the seal crimped into sealing position, Fig. 9 is a plan view of a strip blank for another form of seal, used for tagging, Fig. 10 is a longitudinal section through the open seal formed from the blank shown in Fig. 9, and Fig. 11 is a section similar to Fig. 10, but showing the seal crimped into closed sealing position.

In the specific form of the invention shown in Figs. 1 to 8, the seal in the general form of a zig-zag loop is made from a single strip 10 of comparatively rigid but bendable material, such as thin sheet metal, bent transversely along fold lines A, B and C to bring the opposed ends 11 of said strip together in the same plane, and to form a substantially straight section 12 composed of the abutting end portions of the strip, an opposed parallel section 13, and a pair of connecting walls each formed of a pair of inwardly converging sections 15 and 16.

In order to adapt the seal for the reception of an attaching member in the form of a wire shackle 17, the section 12 is provided with a pair of spaced apertures 18 corresponding to the distance between the prongs or legs of said shackle. The infolded side sections 15 and 16 have apertures 20 and 21 respectively, and the bottom seal section 13 has a pair of spaced apertures 22, the apertures 18, 20, 21 and 22 on each side of the seal being in alignment to permit a shackle leg to pass therethrough as shown in Fig. 7.

In order to facilitate the bending of the blank strip 10 and predetermine the fold lines thereof, and at the same time weaken said strip along said fold lines sufficiently to cause breakage thereof upon reverse bending, said strip has a series of apertures 23 which may be round or may extend transversely along the respective fold lines A, B and C.

In order to impart substantial rigidity to the various sections of the seal, the seal sections 15, 16 and 13 are provided respectively with embossed channel ribs 24, 25 and 26, extending lengthwise thereof. These channel ribs are so arranged, that when the seal is crimped and collapsed into sealing position shown in Fig. 8, the ribs of the overlapping sections will nest into each other, thereby permitting the various superposed sections to come closer together and the seal to be more sharply bent along its fold lines. For that purpose, the ribs are embossed alternately in opposite directions from the general plane of the blank as shown in Fig. 2, so that when said blank is folded into the form shown in Fig. 5, the rib 26 on the section 13 and the ribs 24 on the sections 15 extend outwardly, and the ribs 25 on the sections 16 extend inwardly.

When it is desired to apply the seal for sealing, identifying, tagging or the like, the shackle 17 is passed through the member to be sealed, and then through the two rows of aligned apertures 18, 20, 21 and 22, so that the outer ends of the legs of said shackle extend outwardly from the seal section 13. The two opposed seal sections 12 and 13 are then pressed together either by means of the fingers if the shackle 17 is yieldable enough, or by means of a pair of pliers or pinchers to move these sections together. This operation causes the infolded sections 15 and 16 to collapse inwardly into overlapping relationship shown in Fig. 8. The inward movement of the shackle receiving portions of the collapsing seal sections 15 and 16 forms inwardly extending U-shaped deformations 27 in the legs of the shackle 17 as shown in Fig. 8. These deformations prevent withdrawal of the shackle from the closed seal.

As the two opposed parallel sections 12 and 13 are brought together during this crimping or collapsing of the seal, the ribs 24 of the sections 15 nest into said ribs 25 of the sections 16, and the latter nest into the rib 26 of the sections 13. The resultant sharp bending along the fold lines causes weakening of the seal therealong, so that any attempt to open the seal will cause it to break along said fold lines.

In Figs. 9 to 11 is shown another form of seal, which is adapted to be used for applying a tag to a garment or the like, and which may be made of smaller construction to that shown in Figs. 1 to 8. In this modified construction, the seal, made from a flat metal strip 10a (Fig. 9), is of the same general form as that shown in Figs. 1 to 8, except that the top section 12 is provided with a pair of apertures 30, adapted to receive the prongs 31 of a conventional wire staple 32, and spaced inwardly from the fold lines C of the collapsible side sections 15 and 16 in open position of the seal to permit said prongs to pass between said fold lines without passing through said side sections. These side sections 15 and 16, and the bottom section 13 are not perforated to receive the staple prongs 31 as in the construction shown in Figs. 1 to 8, so that said prongs are confined entirely within the seal housing.

In the application of the seal, the staple 32 with the usual identifying or price tag 33 attached thereto, is pierced through the fabric 35 of a garment or similar article to be tagged, and then passed through the perforations 30 as shown in Fig. 10. The two opposed flat sections 12 and 13 of the seal are then pressed together with the fingers, this movement causing deformation of the prongs 31 as shown in Fig. 11, so that withdrawal of the staple from the seal is prevented. Any attempt to open this seal will cause breakage thereof along the fold lines in a manner already indicated with reference to the constructions of Figs. 1 to 8.

The collapsed seal not only serves to prevent unauthorized tampering with the identification or price tag 33, but also serves as somewhat inconspicuous means for holding said tag closely adjacent to the garment to which it is attached.

Each of the blank strips 10 and 10a with its fold slots, apertures for the attaching members, and embossed ribs may be formed by a single stamping operation, and can be easily bent into an open seal, thereby reducing cost of manufacture to a minimum.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. A metal seal including a strip of sheet metal bent along predetermined fold lines to present opposed spaced strip sections, said strip having apertures for receiving a wire attaching member in open position of said seal, and means operable upon collapse of said sections for deforming said wire attaching member to prevent withdrawal of said member from said seal, said fold lines being strong enough to permit collapse of said sections, but breakable upon reverse bending of said sections toward open position of the seal.

2. A metal seal adapted to be sealably secured to an attaching member, comprising a strip of sheet metal bent to form a pair of opposed sections and a pair of connecting sections, each of said connecting sections having a fold line intermediate of its ends, one of said first mentioned sections having apertures, the fold lines of said connecting sections being movable past said apertures upon forcing the first mentioned sections together.

3. A metal seal adapted to be sealably secured to an attaching member, comprising a strip of sheet metal bent to form a pair of opposed sections and a pair of connecting sections, each of said connecting sections having a fold line intermediate of its ends, one of said first mentioned sections having apertures, the fold lines of said connecting sections being movable past said apertures upon forcing the first mentioned sections together, at least one of said fold lines being strong enough to permit bending to bring said opposed sections together, but breakable upon reverse bending.

4. A seal adapted to be sealably secured to a shackle, comprising a metal strip bent along predetermined fold lines transversely of said strip to form a pair of opposed substantially straight parallel sections, and a pair of inwardly converging sections on each side of and between said opposed sections, collapsible upon relative movement of said opposed sections toward each other, the fold lines between the sections being strong enough to permit bending of said converging sections, but weak enough to break upon reverse bending of said converging sections, one of said opposed sections having a pair of spaced apertures for receiving the two wire prongs of said shackle.

5. A seal comprising a metal strip bent along predetermined fold lines transversely of said strip to form a pair of opposed substantially straight parallel sections, and a pair of inwardly converging connecting sections on each side of and between said opposed sections, collapsible upon relative movement of said opposed sections towards each other, one of said opposed sections and both of said connecting sections having apertures, spaced inwardly from the apex edges of said converging sections to receive the two wire legs of a shackle between said edges.

6. A metal seal adapted to be sealably secured to an attaching member, including a sheet metal strip bent to form a plurality of sections connected in series and bent zig-zag along fold lines, whereby said sections in closed position of the seal are collapsed in overlapping relationship, said sections having reinforcing channel ribs, embossed alternately from opposite faces thereof, and in collapsed position of said sections being nested within each other, to permit sharper bend along said fold lines in closed position of said seal.

7. A sealing device adapted to be sealably secured to an attaching member, comprising a strip of metal, having six spaced weakened transverse fold lines, and predetermining seven sections connected end to end, each of the end sections having an aperture for receiving the leg of a shackle or staple in folded position of the seal, said strip foldable along said lines to form a pair of opposed parallel sections and connecting inwardly converging portions, the two end sections of the strip having apertures, and said strip being strong enough along said fold lines to permit adjoining sections to be substantially doubled along their intervening fold lines, but weak enough so that it will break along said fold lines upon reverse bending.

8. A sealing device adapted to be sealably secured to an attaching member, comprising a strip of metal, having six spaced weakened transverse fold lines predetermining seven sections connected end to end, each of the end sections having an aperture for receiving the leg of a shackle in folded position of the seal, said fold lines being strong enough to permit adjoining sections to be substantially doubled to superposed positions, but weak enough so that they will break upon reverse bending, and each of the middle five sections being provided with a longitudinally extending reinforcing channel rib, and said ribs extending alternately from opposite faces of successive sections.

FRANK KEIDEL.